May 5, 1970  D. E. KIFER  3,509,611

RASP FILE

Filed Jan. 30, 1968

INVENTOR
DAVID E. KIFER

BY
*Oberlin, Maky, Donnelly & Renner*
ATTORNEYS

United States Patent Office 3,509,611
Patented May 5, 1970

1

3,509,611
RASP FILE
David E. Kifer, Parma, Ohio, assignor to The L. R. Oatey
Company, Cleveland, Ohio, a corporation of Ohio
Filed Jan. 30, 1968, Ser. No. 701,628
Int. Cl. B26d 1/00; B21k 21/00
U.S. Cl. 29—78                                    8 Claims

ABSTRACT OF THE DISCLOSURE

A rasp file having a multitude of cutting edges arranged in pairs of diagonal rows, with the cutting edges in the alternate pairs of rows axially aligned with each other and the cutting edges in the intermediate pairs of rows axially aligned with each other but slightly staggered or offset with respect to the alternate pairs of rows so that the paths of the cutting edges in the intermediate pairs of rows transversely overlap the paths of cutting edges in the alternate pairs of rows when the file is moved in a generally longitudinal direction. Each cutting edge is immediately preceded by a generally square opening of sufficient size for effective removal of chips.

BACKGROUND OF THE INVENTION

This invention relates generally as indicated to a rasp file and more particularly to certain improvements in cutting and abrading tools of this general type which have particular utility in filing plastics and the like.

In recent years, much use has been made of polyester resin based plastics in the repair of automobile bodies. After the plastic has been applied and allowed to harden, the excess is removed by filing. Various types of files have been satisfactorily used for this purpose, but there is a tendency for such files to become clogged with chips which greatly reduce their effectiveness, and oftentimes the files will tear to gouge the plastic especially when it is still somewhat soft.

SUMMARY OF THE INVENTION

With the foregoing in mind, it is the principal object of this invention to provide a rasp file which is substantially clog proof and will not gouge or tear even soft plastics. These and other objects are achieved by providing a file with cutting edges which are arranged in pairs of diagonal rows with respect to the longitudinal axis of the file. The alternate pairs of rows have axially aligned cutting edges, as do the intermediate pairs of rows, but the cutting edges in the intermediate pairs of rows are slightly staggered or offset with respect to the cutting edges in the alternate pairs of rows so that the cutting edges overlap each other regardless of the direction in which the tool is moved during filing. Immediately forword of each cutting edge is a generally square opening which extends through the body of the file and is sufficiently large to provide ample clearance for effective removal of the chips.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

BRIEF DESCRIPTION OF THE DRAWING

In the annexed drawing.

DESCRIPTION OF THE PREFERRED EMBODIMENTS

Figure 1:
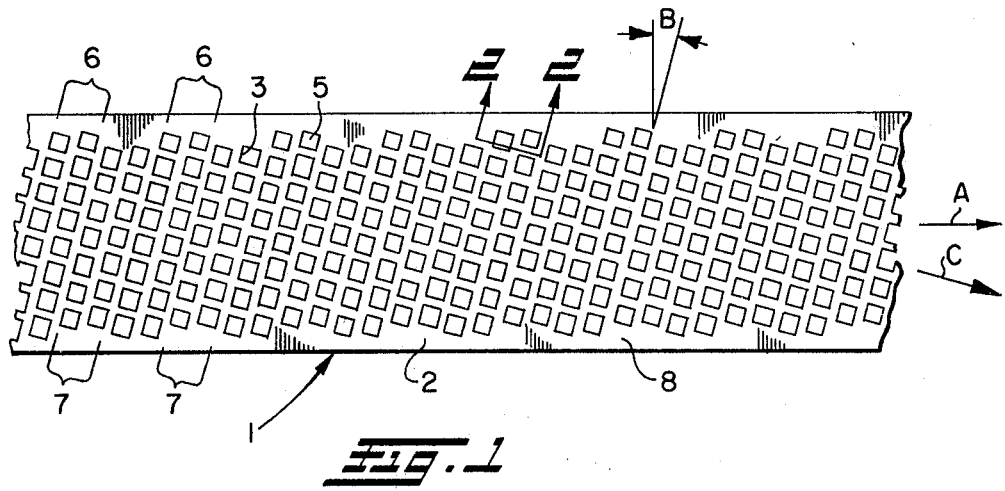
FIG. 1 is a fragmentary plan view of the back face of a rasp file in accordance with this invention which has a generally flat body.
Figure 2:
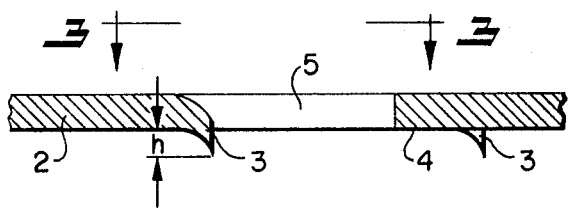
FIG. 2 is a fragmentary vertical section through one of the chip removal openings of the file of FIG. 1, taken on the plane of the line 2—2 thereof.
Figure 3:
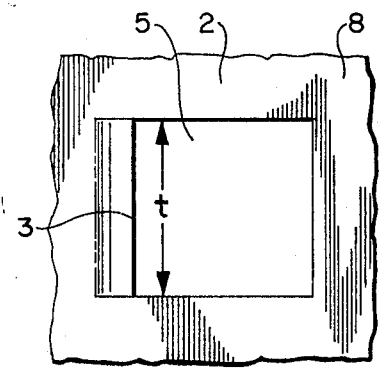
FIG. 3 is an enlarged fragmentary plan view of one of the cutting edges and adjacent chip removal openings as seen in FIG. 1.

Referring now in detail to the drawing and first especially to the form of the invention in FIGS. 1 through 3, there is shown a rasp file 1 comprising an elongated strip or body member 2 of sheet metal having a multitude of cutting edges 3 projecting from the front face 4 of the strip. Immediately forward of each cutting edge 3 is an opening 5 which extends completely through the strip and has a generally square configuration the dimensions of which are substantially greater than the height $h$ of the cutting edges so as to provide ample clearance for removal of the chips formed by the cutting edges, in a manner to be more fully explained hereafter.

As apparent from FIG. 1, the cutting edges 3 and adjacent openings 5 are arranged in parallel rows which extend diagonally across the width of the strip thus to progressively shear the material of a workpiece during movement of the file thereover in a generally longitudinal direction as indicated by the arrow A. Although the angle B of the rows may be varied within limits, it is preferred that such angle be relatively small, in the order of 15°, to minimize the tendency of the tool 1 to turn during use while still obtaining the desired shearing action.

Within each diagonal row, the cutting edges 3 and openings 5 are desirably of a uniform size and uniformly spaced apart. Moreover, the cutting edges 3 and openings 5 in the alternate pairs of rows 6 are preferably in direct longitudinal alignment with each other, as are the cutting edges 3 and openings 5 in the intermediate pairs of rows 7. However, the cutting edges and openings in the intermediate pairs of rows 7 are slightly staggered or transversely offset with respect to the cutting edges and openings in the alternate pairs of rows 6 so that the paths of the cutting edges in the intermediate pairs of rows transversely overlap the paths of cutting edges in the alternate pairs of rows when the file is moved in a generally longitudinal direction. Thus, for example, if the tool is turned slightly before it is moved across the work to engage the work in a direction generally indicated by the arrow C, the cutting edges will still be out of alignment with each other. This insures substantially complete removal of a layer of material during each pass of the tool across the work, since the material which is not removed by the cutting edges of one pair of rows will be removed by the cutting edges of a succeeding pair of rows. Accordingly, the surface of the work will not be gouged or torn by the cutting edges, which is particularly important when removing plastic automobile body filler material and the like.

Figure 4:
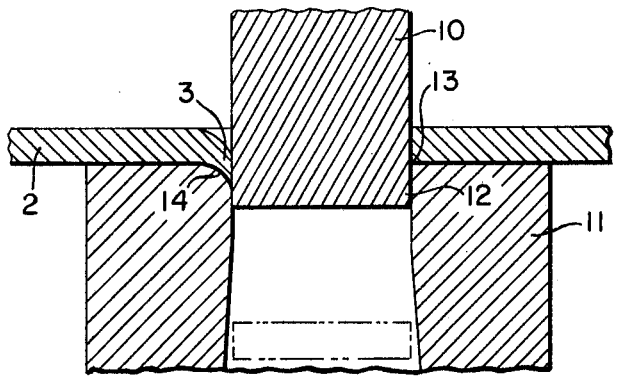
FIG. 4 is a schematic diagram illustrating the manner in which the cutting edges and adjacent openings are formed in a single die stamping operation.

Although the projecting height $h$ of the cutting edges 3 may vary within limits, such height should be a minimum of .007 inch and a maximum of .016 inch but preferably .010 inch. If less than .007 inch high, the cutting edges will be substantially ineffective in removing plastic material, and if greater than .016 inch, they will tend to gouge the plastic. Moreover, the length $t$ of each cutting edge 3 should be relatively short and there should be as many cutting edges as practicable so that the chips will readily break up and be sufficiently small easily to pass through the square openings 5. Excellent results have been obtained with cutting edges having a length of 1/8 inch with a spacing of 1/16 inch between the cutting edges in each row. As clearly shown in FIGS. 3 and 4, each cutting edge has a leading face generally perpendicular to the plane of the file strip and a radiused trailing face intersecting the leading face to form a sharp cutting edge.

In selecting the size of the openings 5, it will be appreciated that the openings need not be any wider than the length of the cutting edges, and in fact, if made wider than that, it would necessitate a reduction in the number of cutting edges in each row since the spacing between the openings would be the critical dimension. Accordingly, the width of the openings 5 is 1/8 inch (the same as the length of the cutting edges), and such openings are in the shape of a square, rather than of a narrower length than width as is common practice, since it has been found that the tendency for the tool to clog is not nearly as great especially when used with plastics if the length of the openings 5 is sufficient to permit the chips to fall back through the openings when the tool is lifted away from the work.

The spacing between adjacent rows is also desirably as close as practicable to provide as many cutting edges as possible for a given length file. In actual practice, it has been found that 3/32 inch between rows is preferred.

With the cutting edges 3 and openings 5 dimensioned and spaced as just described, a simple shifting or staggering of the intermediate pairs of rows 7 approximately .127 inch with respect to the alternate pairs of rows 6 will assure against the cutting edges being in alignment with each other so that the path of the cutting edges in the intermediate pairs of rows transversely overlap the paths of the cutting edges in the alternate pairs of rows when the file is moved in a generally longitudinal direction.

The strip material from which the file is made and its dimensions may also vary, but it is preferred that it be of high carbon steel approximately .025 inch thick and 1 5/8 inch wide. This will permit the formation of eight cutting edges and openings in each row of the alternate pairs 6, and seven cutting edges and openings in each row of the intermediate pairs 7.

The tool 1 may be formed using a progressive die having two sets of punches and dies. All of the punches and dies are identical and include a square ended punch 10 and a die 11 having a square opening 12 therein for receipt of the punch 10, with sharp corners 13 around three sides of the opening 12, similar to that shown in FIG. 4. The other side 14 is radiused to a depth equal to the desired height $h$ of the cutting edges, in this case preferably .010 inch. The first set of punches and dies are staggered to form alternate ones of the openings and cutting edges in each row over a given length of strip, as for example, the length of 12 rows, whereas the second set of punches and dies are arranged to form the intermediate openings and cutting edges in a subsequent forming operation. Thus, the strip is first placed over the first set of dies and the first set of punches are moved toward the strip first to pierce three sides of the openings, after which the pierced metal is forced downwardly into engagement with the radiused sides 14 of the dies 11 and subsequently trimmed by continued downward movement of the punches to form sharp cutting edges with substantially zero rake angle. Thereafter, the strip is indexed to the other set of punches and dies for forming the intermediate openings and cutting edges in each row while a second set of openings and cutting edges is being formed by the first set of punches and dies, and so on.

Figure 5:
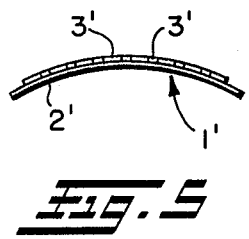
FIG. 5 is an end elevation view of a rasp file substantially identical to that shown in FIGS. 1 through 4, except that it is transversely arcuate rather than flat.

Upon completion of the forming operation, the strip material is cut into desired lengths and either left flat as shown in FIGS. 1 and 2 or the file 1' is arcuately transversely bent as shown in FIG. 5, whereupon suitable mounting clips may be attached to the back face of the tool adjacent the ends thereof by spot welding or projection welding, and the complete assembly is heat treated in conventional manner.

From the foregoing, it will be readily apparent that the tool of the present invention is of a relatively simple and unique construction which substantially completely eliminates gouging of a workpiece by the cutting edges and clogging of the tool with chips. Although the tool has been discussed with specific reference to its use in removing plastic material such as used in the repair of automobile bodies and the like, it will be appreciated that the principles disclosed herein may also be applied to tools for use in removing other materials as well, such as wood and metal.

Other modes of applying the principles of the invention may be employed, change being made as regards the details described, provided the features stated in any of the following claims or the equivalent of such be employed.

I therefore, particularly point out and distinctly claim as my invention:

1. A rasp file comprising an elongated metal strip having a plurality of spaced apart cutting edges projecting from one side of said strip, each of said cutting edges having an opening immediately forward thereof extending through said strip, said cutting edges and associated openings being arranged in successive intermediate and alternate pairs of parallel rows extending diagonally across said strip, said cutting edges and openings in said alternate pairs of said rows being in direct longitudinal alignment with each other, and said cutting edges and openings in said intermediate pairs of said rows being in direct longitudinal alignment with each other but transversely offset with respect to said cutting edges and openings in said alternate pairs of rows so that the paths of the cutting edges in said intermediate pairs of rows transversely overlap the paths of the cutting edges in said alternate pairs of rows when said file is moved in a generally longitudinal direction.

2. The file of claim 1 wherein said openings are of a generally square configuration whose dimensions are substantially equal to the length of said cutting edges.

3. The file of claim 1 wherein said rows of cutting edges are disposed on a diagonal of 15°.

4. The file of claim 2 wherein the projecting height of said cutting edges is between .007 inch and .016 inch.

5. The file of claim 2 wherein the length of said cutting edges and dimensions of said openings are approximately 1/8 inch, and there is a spacing of approximately 1/16 inch between the cutting edges in each row, and a spacing of approximately 3/32 inch between rows.

6. The tool of claim 5 wherein said cutting edges in said intermediate pairs of rows are transversely offset approximately .127 inch with respect to said cutting edges in said intermediate pairs of rows.

7. The file of claim 1 wherein said cutting edges have a leading face generally perpendicular to the plane of the file strip and a radiused trailing face intersecting said leading face to form a sharp cutting edge.

8. The file of claim 2 wherein the dimensions of said openings are substantially greater than the height of said cutting edges, whereby chips cut from the work during a pass of the file are free to fall back through the openings when the file is lifted away from the work.

References Cited

UNITED STATES PATENTS

| | | | |
|---|---|---|---|
| 2,984,892 | 5/1961 | Oxford et al. | 29—78 |
| 3,180,005 | 4/1965 | Oxford | 29—78 |
| 3,332,127 | 7/1967 | West | 29—78 |

HARRISON L. HINSON, Primary Examiner

U.S. Cl. X.R.

76—24, 101